United States Patent
Ranjan et al.

(10) Patent No.: US 11,836,412 B1
(45) Date of Patent: Dec. 5, 2023

(54) SCREEN SHARING RECALL

(71) Applicant: International Business Machines Corporation, Armonk, NY (US)

(72) Inventors: Paritosh Ranjan, Kolkata (IN); Bhubaneswar Padhan, Kolkata (IN); Prodip Roy, Kolkata (IN); Prosanta Saha, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 18/171,424

(22) Filed: Feb. 20, 2023

(51) Int. Cl.
  G06F 3/14 (2006.01)
  H04L 49/90 (2022.01)
  G06F 3/04842 (2022.01)
  H04L 65/403 (2022.01)

(52) U.S. Cl.
  CPC ........ *G06F 3/1454* (2013.01); *G06F 3/04842* (2013.01); *H04L 49/90* (2013.01); *H04L 65/403* (2013.01)

(58) Field of Classification Search
  CPC ... G06F 3/1454; G06F 3/04842; H04L 49/90; H04L 65/403
  See application file for complete search history.

(56) References Cited

U.S. PATENT DOCUMENTS

| | | | |
|---|---|---|---|
| 9,141,332 B2 | 9/2015 | Coleman | |
| 9,699,271 B2 | 7/2017 | Brander | |
| 10,732,917 B2 | 8/2020 | Spencer | |
| 2004/0075619 A1 | 4/2004 | Hansen | |
| 2006/0002315 A1 | 1/2006 | Theurer | |
| 2010/0257450 A1 | 10/2010 | Go | |
| 2015/0278534 A1 | 10/2015 | Thiyagarajan | |
| 2021/0048973 A1 | 2/2021 | Schwabacher | |

OTHER PUBLICATIONS

"Build desktop apps for Windows | Microsoft Learn", accessed on Feb. 2, 2023, 2 pages, <https://learn.microsoft.com/en-us/windows/apps/desktop/>.
"Creating a macOS App", SwiftUI Tutorials | Apple Developer Documentation, accessed on Feb. 2, 2023, 27 pages, <https://developer.apple.com/tutorials/swiftui/creating-a-macos-app>.
"Database", Wikipedia, accessed on Feb. 2, 2023, 16 pages, <https://en.wikipedia.org/wiki/Database>.

(Continued)

*Primary Examiner* — Pei Yong Weng
*Assistant Examiner* — Peiyong Weng
(74) *Attorney, Agent, or Firm* — Michael O'Keefe

(57) ABSTRACT

According to one embodiment, a method, computer system, and computer program product for screen sharing recall is provided. The embodiment may include receiving a user-selected delay setting value. The embodiment may also include, in response to receiving an instruction from a user to begin a screen sharing session during a web conference, storing streamed frames captured of a user display screen in a buffer. The embodiment may further include, in response to a frame from the buffer satisfying the user-selected delay setting value, transmitting the frame to a graphical user interface associated with each other participant to the web conference. The embodiment may also include, in response to determining the user wishes to recall one or more frames stored in the buffer, performing a recall action.

20 Claims, 10 Drawing Sheets

(56) References Cited

OTHER PUBLICATIONS

"What does buffering mean? | Buffering in video streaming | Cloudflare", © 2023 Cloudflare, Inc., 5 pages, <https://www.cloudflare.com/learning/video/what-is-buffering/>.
"What is Caching and How it Works | AWS", © 2023, Amazon Web Services, Inc, 8 pages, <https://aws.amazon.com/caching/>.
"What is streaming? | How video streaming works | Cloudflare", © 2023 Cloudflare, Inc., 5 pages, <https://www.cloudflare.com/learning/video/what-is-streaming/>.
Baeldung, "GUI Under Linux", last modified Nov. 8, 2022, 13 pages, <https://www.baeldung.com/linux/gui>.
Crow et al., "A Frame System With Enhanced Functionality", Computer Graphics, vol. 15, No. 3, Aug. 1981, © 1981 ACM 0-8971-045-1/81-0800-0063, 7 pages.
IBM, "What is a Rest API?", accessed on Feb. 2, 2023, 8 pages, <https://www.ibm.com/topics/rest-apis>.

SCREEN SHARING RECALL

BACKGROUND

The present invention relates generally to the field of computing, and more particularly to web conferencing.

Web conferencing, including but not limited to audio conferencing and video conferencing, may relate to any communication between two or more individuals over a network, such as the Internet, where the participating members utilize audio and/or video streams. Web conferencing allows for a dynamic interface between users in separate locations to efficiently communicate as if they were in person by allowing face-to-face interactions and the sharing of files between participating users. Popular web conferencing applications include Zoom® (Zoom and all Zoom-based trademarks and logos are trademarks or registered trademarks of Zoom Video Communications Inc. and/or its affiliates), Webex® (Webex and all Webex-based trademarks and logos are trademarks or registered trademarks of Webex Communications, Inc. and/or its affiliates), GoToMeeting® (GoToMeeting and all GoToMeeting-based trademarks and logos are trademarks or registered trademarks of Citrix Online, LLC. and/or its affiliates), and FaceTime® (Facetime and all Facetime-based trademarks and logos are trademarks or registered trademarks of Apple Inc. and/or its affiliates) among others.

SUMMARY

According to one embodiment, a method, computer system, and computer program product for screen sharing recall is provided. The embodiment may include receiving a user-selected delay setting value. The embodiment may also include, in response to receiving an instruction from a user to begin a screen sharing session during a web conference, storing streamed frames captured of a user display screen in a buffer. The embodiment may further include, in response to a frame from the buffer satisfying the user-selected delay setting value, transmitting the frame to a graphical user interface associated with each other participant to the web conference. The embodiment may also include, in response to determining the user wishes to recall one or more frames stored in the buffer, performing a recall action.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
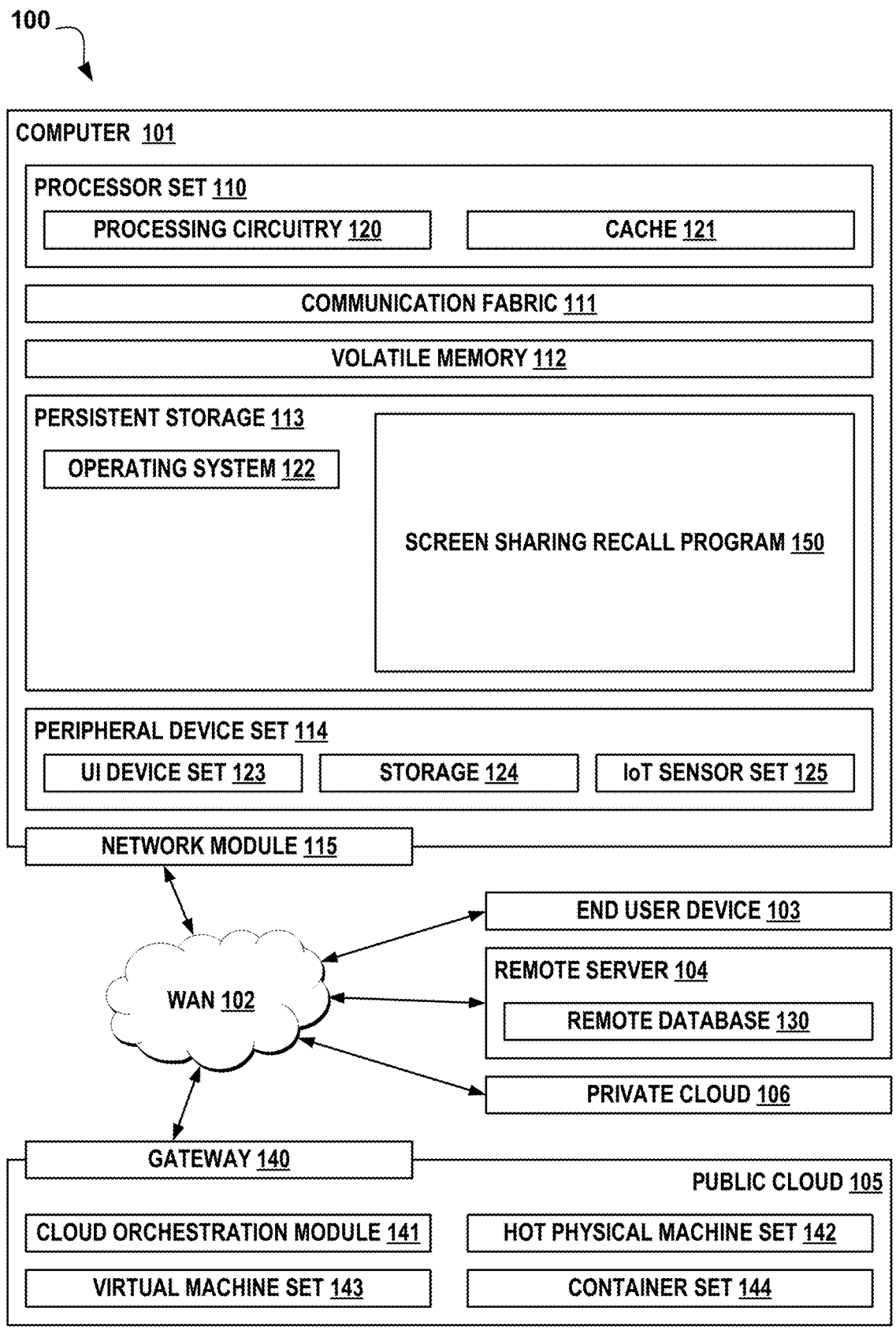
FIG. 1 illustrates an exemplary networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

It is to be understood that the singular forms "a," "an," and "the" include plural referents unless the context clearly dictates otherwise. Thus, for example, reference to "a component surface" includes reference to one or more of such surfaces unless the context clearly dictates otherwise.

Embodiments of the present invention relate to the field of computing, and more particularly to web conferencing. The following described exemplary embodiments provide a system, method, and program product to, among other things, recall a screen sharing session during a video conference prior to transmitting the shared screen images with other web conference participants. Therefore, the present embodiment has the capacity to improve the technical field of web conferencing by ensuring confidentiality of information through an integrated screen sharing recall process.

As previously described, web conferencing, including but not limited to audio conferencing and video conferencing, may relate to any communication between two or more individuals over a network, such as the Internet, where the participating members utilize audio and/or video streams. Web conferencing allows for a dynamic interface between users in separate locations to efficiently communicate as if they were in person by allowing face-to-face interactions and the sharing of files between participating users. Popular web conferencing applications include Zoom®, Webex®, GoToMeeting®, and FaceTime® among others.

To initiate a web conference, a host invites, or allows, attendees to join the web conference through a web conferencing software. Meeting attendees, including the host, who wish to share content with other participants often share the screen of their computing device with other participants through one or more settings on a graphical user interface.

Due to any number of reasons, a participant sharing their screen with other participants may expose sensitive, confidential, restricted, controlled, or any other content to the screen sharing session that a presenting user does not wish to share with the other web conference participants. The information may be presented in a document, a web page, a popup window, an email, or any other medium of presenting information on a screen sharing session. Furthermore, the event causing the information to be shared can be caused by changing to a different window, an application notification, or any other configuration that brings new content to the screen sharing session. As such, it may be advantageous to, among other things, implement a solution to recall a screen sharing session of a web conference before the information being displayed is presented to the other participants of the web conference.

According to one embodiment, a screen sharing recall program may allow a user to preconfigure a screen sharing delay that stores images captured by a web conferencing software during a screen sharing session in a buffer. The screen sharing recall program may continually store the images in the buffer but may not transmit the buffered images to the other web conference participants until the buffer is full. Once the buffer is full, the screen sharing recall program may transmit the buffered images in a first-in, first-out (FIFO) manner. Once an image is transmitted, the screen sharing recall program may delete the specific image from the buffer.

The screen sharing recall program may continue through the buffering and transmission of images until a user either ends the screen sharing session or the user interacts with a recall option. The recall options may be utilized when a user inadvertently exposes information to the screen sharing session that the user does not wish to share with the other web conference participants. Once recalled, the screen sharing recall program may delete all images within the buffer, which may prevent the accidentally shared images from being transmitted to the other web conference participants.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Referring now to FIG. 1, computing environment 100 contains an example of an environment for the execution of at least some of the computer code involved in performing the inventive methods, such as screen sharing recall program 150. In addition to screen sharing recall program 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and screen sharing recall program 150, as identified above), peripheral device set 114 (including user interface (UI), device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, for illustrative brevity. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in screen sharing recall program 150 in persistent storage 113.

Communication fabric 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, the volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid-state storage devices. Operating system 122 may take several forms, such as various known proprietary operating systems or open-source Portable Operating System Interface-type operating systems that employ a kernel. The code included in screen sharing recall program 150 typically includes at least some of the computer code involved in performing the inventive methods.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made though local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN 102 and/or LANs typically include computer hardware such as copper transmission cables, optical transmission fibers, wireless transmission, routers, firewalls, switches, gateway computers and edge servers.

End user device (EUD) 103 is any computer system that is used and controlled by an end user and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community, or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

According to at least one embodiment, the screen sharing recall program 150 may allow a user to preconfigure a buffer time delay in which to hold or store images before transmission to other web conference participants during a screen sharing session. The screen sharing recall program 150 may store each image in a FIFO manner in a buffer before transmitting each image. Upon transmission of an image, the screen sharing recall program 150 may delete the image from the buffer. Upon determining that a user has interacted with a recall option, the screen sharing recall program 150 may clear, or delete, all images from the buffer and may not transmit any further images until the buffer is full or until the user has reengaged a screen sharing option. Furthermore, notwithstanding depiction in computer 101, the screen sharing recall program 150 may be stored in and/or executed by, individually or in any combination, end user device 103, remote server 104, public cloud 105, and private cloud 106. The screen sharing recall method is explained in more detail below with respect to FIGS. 2 and 3A-3H.

Figure 2:
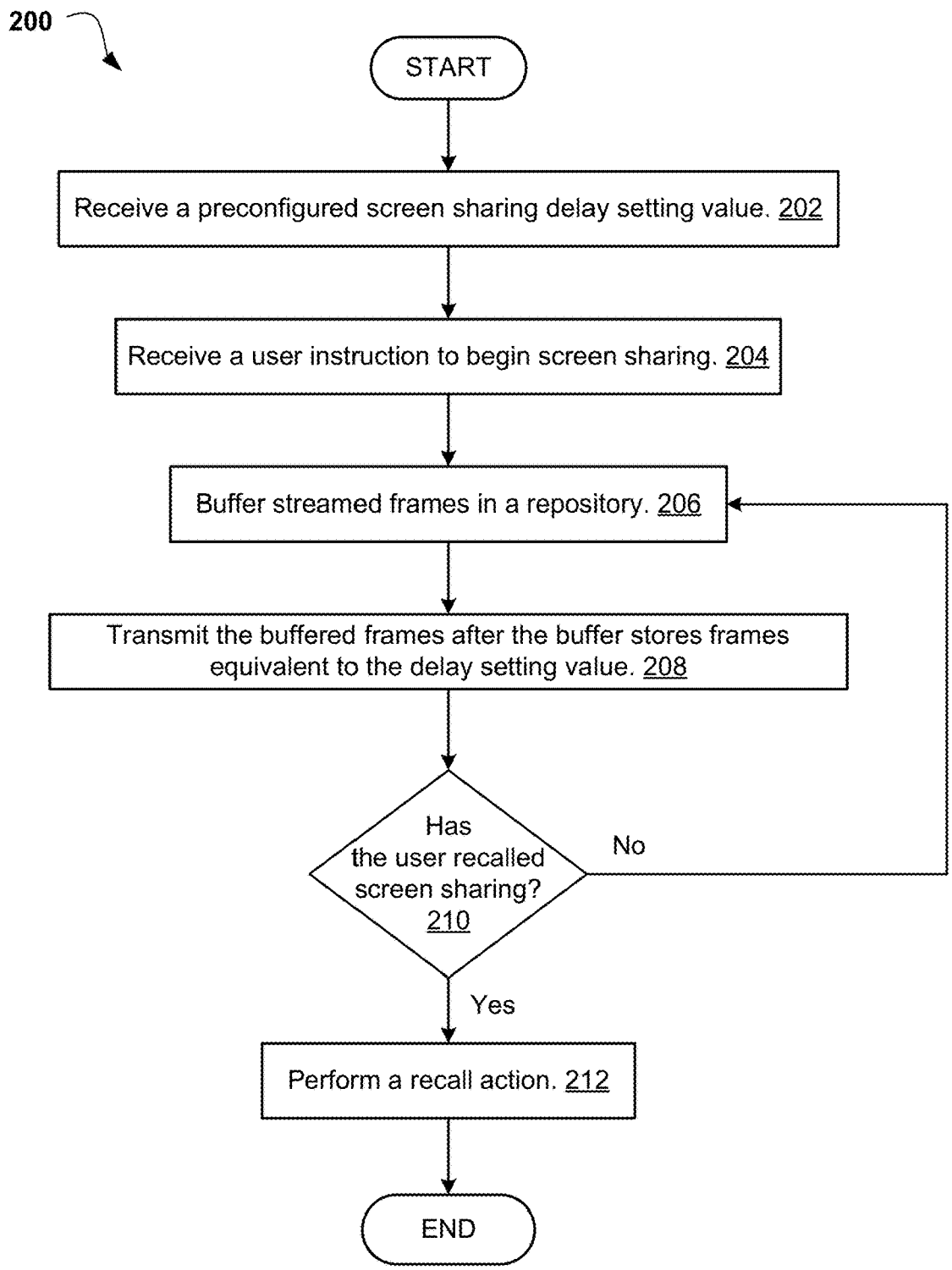
FIG. 2 illustrates an operational flowchart for a screen sharing recall process according to at least one embodiment.

Referring now to FIG. 2, an operational flowchart for a screen sharing recall process 200 is depicted, according to at least one embodiment. At 202, the screen sharing recall program 150 receives a preconfigured screen sharing delay setting value. The screen sharing recall program 150 may require a user to preconfigure a value for a screen sharing delay time period before the screen sharing recall program 150 may allow a recall capability with a web conferencing application. The time delay value may be any value expression of time, such as seconds or milliseconds. In one or more embodiments, the screen sharing recall program 150 may be an extension or addon to a web conferencing software and, thus, may store the time delay setting in a repository either in or associated with the web conferencing software. In one or more other embodiments, screen sharing recall program 150 may store the time delay setting value in a local repository, such as storage 124, or a remote repository, such as remote database 130.

Next, at 204, the screen sharing recall program 150 receives a user instruction to begin screen sharing. During a web conference, a user may, by default, enable transmission of audio and/or video streams. However, many web conferencing programs require manual enablement of screen sharing prior to each instance of a user sharing their screen during a particular web conference. As such, the screen sharing recall program 150 may monitor user interactions with the graphical user interface of the web conferencing software for user initiation of a screen sharing setting of the web conferencing software. Once a user interacts with a screen sharing setting on a web conferencing software graphical user interface (e.g., a user-selectable icon), screen sharing may commence by recording a video stream of the images projected to the user device's display screen.

Then, at 206, the screen sharing recall program 150 buffers streamed frames in a repository. Once the screen sharing recall program 150 determines the user has enabled screen sharing functionality during the web conference, the screen sharing recall program 150 may begin loading images to buffer storage. The buffer storage may be within computer 101, such as volatile memory 112 or persistent storage 113, or within storage 124 of peripheral device set 114. In one or more embodiments, the buffer storage may also be located on a server, such as remote server 104, public cloud 105, or private cloud 106. The number of images stored within buffer storage may vary depending on the preconfigured value of the screen sharing delay setting value established in step 202 and the video quality or resolution and framerate of the display screen feed. For example, the screen sharing recall program 150 may store more images in buffer storage for a screen sharing stream running at 60 frames per second than for a stream running at 24 frames per second. The variations allowed in video quality, framerate, and screen sharing delay setting value may affect the size of the buffer storage allocation established by the screen sharing recall program 150.

In at least one embodiment, the screen sharing recall program 150 may allocate a certain amount of memory to the buffer storage allocation when a web conference is commenced or joined or upon the user selecting to screen share. In at least one embodiment, the screen sharing recall program 150 may determine the size of the allocation for buffer storage based on the configurations for various default or user preconfigured settings, including, but not limited to, video quality, framerate, and screen sharing delay setting value.

Next, at 208, the screen sharing recall program 150 transmits frames after the buffer stores frames equivalent to the delay setting value. Once the buffer stores frames, or images, equivalent to the screen sharing delay setting value, the screen sharing recall program 150 may transmit any images that have been stored in buffer storage for the delay value to the other participants of the web conference. For example, if the screen sharing delay setting value is preconfigured to five seconds, the screen sharing recall program 150 may store frames of the shared screen stream in buffer storage until a frame has been stored for five seconds. Upon a frame being stored in the buffer storage for five seconds, the screen sharing recall program 150 may transmit the stored frame to the other participants for viewing. In at least one embodiment, the screen sharing recall program 150 may also store audio timed to play accordingly with the video frames being stored and transmitted. By storing the images and associated audio in buffer storage for the preconfigured delay period, the screen sharing recall program 150 may, in effect, create a delay period for the streamed screen share. Once the screen sharing recall program 150 transmits a frame to the other web conference participants, the screen sharing recall program 150 may delete the frame from the buffer storage in order to free up room for the next captured frame to be stored in the buffer storage.

In one or more embodiments where the buffer storage has a storage size equivalent to the number of images needing to be stored for the time delay (e.g., buffer storage sized to hold 300 frames at a particular resolution based on a five second time delay at sixty frames per second). Once the buffer reaches capacity, the screen sharing recall program 150 may transmit the oldest frame stored and transmit it to the web conference participants then receive a new, most recently captured frame from the screen sharing user.

In one or more other embodiments, the screen sharing recall program 150 may include a reference screen on a graphical user interface of the screen sharing user's device display that shows the images currently being presented to the other web conference participants. The screen sharing recall program 150 may present the reference screen to the user as a smaller window juxtaposed to the user's shared screen in the web conferencing application. The screen sharing recall program 150 may transmit frames from the buffer storage to the user device-based web conferencing application so that to the reference screen may be generated, and depict the delayed screen share, at the same time the screen sharing recall program 150 transmits and displays the delayed screen share to the other web conference participants.

Then, at 210, the screen sharing recall program 150 determines whether the user has recalled screen sharing. The screen sharing recall program 150 may display an icon on the graphical user interface of the web conferencing application that relates to a screen sharing recall feature. The screen sharing recall program 150 may determine that a user has initiated the recall feature when the user interacts with the recall icon. User interactions with the recall icon may involve any manner of computer 101 selection of the recall icon, such as, but not limited to, a mouse click, finger touch on a device touchscreen, and a keyboard stroke.

If the screen sharing recall program 150 determines the user has recalled screen sharing (step 210, "Yes" branch), then the screen sharing recall process 200 may proceed to step 212 to perform a recall action. If the screen sharing recall program 150 determines the user has not recalled screen sharing (step 210, "No" branch), then the screen sharing recall process 200 may return to step 210 to buffer streamed frames to the repository.

Next, at 212, the screen sharing recall program 150 performs a recall action. When a user engaged in sharing their screen with the other web conference participants interacts with the screen sharing recall feature, the screen sharing recall program 150 may perform one or more of a variety of recall actions including, but not limited to, pausing the streamed content from the buffer storage to the web conference participants, ending the screen sharing session immediately, deleting all frames stored within the buffer, and allowing the user to select on or more frames stored within the buffer for deletion. The screen sharing recall program 150 may perform any combination of these actions capable of being performed in combination.

In one or more embodiments, once the user engaging in a screen sharing session interacts with the recall icon, the screen sharing recall program 150 may identify that frames within the buffer are undesirable for transmission to the web conference participants in a screen share. As such, the screen sharing recall program 150 may immediately clear, or delete, all frames within the buffer so as to avoid sharing the content the user does not wish to share with the web conference. Once the buffer is cleared, the screen sharing recall program 150 may either immediately begin rebuffering frames according to the screen sharing session. Such behavior may occur when the user has already moved away from the information the user does not wish to share with the other web conference participants. For example, if the screen sharing user accidentally opens a window on an internet browser that show's the user's financial information and, within two seconds, the screen sharing user clicks away and activates the recall icon, the screen sharing recall program 150 may immediately flush, clear, or otherwise delete all images within the buffer and begin rebuffering the screen sharing session since the information the screen sharing user didn't wish to share is no longer present on the shared screen.

In another embodiment, the screen sharing recall program 150 may identify frames stored in the buffer that are significantly similar to the frame on which the screen sharing session was present when the screen sharing user interacted with the recall icon and delete only those frames from the buffer. For example, continuing the previous situation, the screen sharing recall program 150 may identify the image of the screen sharing user's financial information as undesirable for sharing since the screen sharing user interacted with the recall icon when that particular image was being shared. As such, the screen sharing recall program 150 may identify each image or frame stored in the buffer that is similar to the identified image within a threshold value based on image recognition analysis and delete each image within the buffer.

In one or more embodiments, the screen sharing recall program 150 may pause the stream to each web conference participant, including the reference window stream to the screen sharing user, when the user interacts with the recall icon and the screen sharing recall program 150 deletes each image within the buffer. As such, the screen sharing recall program 150 may retain the last streamed frame of the screen sharing session on the graphical user interface of each web conference participant and the reference window of the screen sharing user. In such situations, when the buffer fills to capacity again, the screen sharing recall program 150 may return to transmitting frames of the screen sharing session to each web conference participant.

In one or more other embodiments, the screen sharing recall program 150 may end the screen sharing session when the user interacts with the recall icon. For example, if the user interacts with the recall icon because undesirable information for sharing was accidentally shared, the screen sharing recall program 150 may delete all images or frames stored in the buffer and immediately end the screen sharing session. The screen sharing recall program 150 may thus require the user to reengage the screen sharing session and allow the buffer to refill before continuing the stream to each web conference participant.

In yet another embodiment, the screen sharing recall program 150 may pause the screen sharing session at the last shared frame from the buffer that was transmitted to each web conference participant, pause the capture of new frames from the screen sharing user's graphical user interface, and present a popup to the screen sharing user to allow the screen sharing user to manually select individual frames within the buffer, including all or any number less than all frames within the buffer, that the screen sharing recall program 150 should delete. Upon receiving the screen sharing user's selections, the screen sharing recall program 150 may delete the frames from the buffer and then recommence the screen sharing session capture to the buffer and, when the buffer is at capacity, transmitting the frames to the web conference participants.

In yet one or more further embodiments, the screen sharing recall program 150 may store audio data within the buffer corresponding to each stored image or frame. When a stored image or frame is deleted from the buffer due to a recall action, the screen sharing recall program 150 may delete the corresponding audio data. When presenting an image or frame to the other participants, the screen sharing recall program 150 may sync the presented image to audio data that was spoken by the screen sharing user, or presenting user, at the same instant the particular image or frame was displayed. Therefore, the screen sharing recall program 150 may ensure any images or frames within the buffer and subsequently transmitted to the other participants remain in sync.

Furthermore, according to another embodiment, when the screen sharing recall program 150 performs a recall action that results in a still image or frame or a blank shared screen due to the buffer deletion and subsequent repopulation, the screen sharing recall program 150 may display a notification to a graphical user interface for each other participant that the presenting user has performed a recall action of their shared screen and the screen sharing will continue once the preconfigured time delay is satisfied.

Figure 3A:
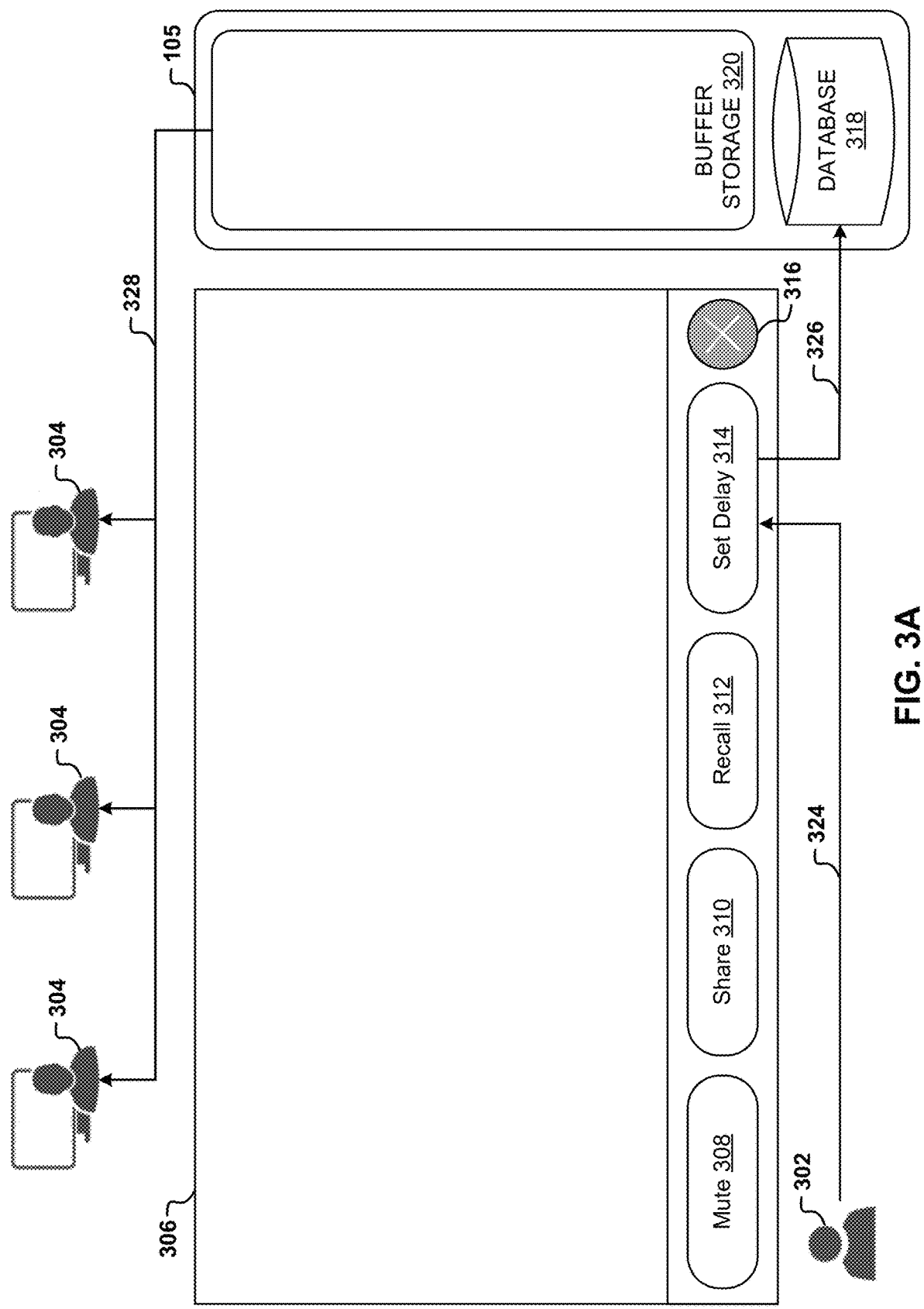
FIGS. 3A-3H illustrate an exemplary block diagram of the screen sharing recall process according to at least one embodiment.

Referring now to FIGS. 3A-3H, an exemplary block diagram of the screen sharing recall process is depicted according to at least one embodiment. In FIG. 3A, a graphical user interface 306 of a web conference application is depicted while a user 302 is interacting with other participants 304. The graphical user interface 306 may include various interactable icons including, but not limited to, a mute icon 308, a share icon 310, a recall icon 312, a set delay icon 314, and an end or leave web conference icon 316. The mute icon 308 may relate to the action of muting the audio of the user 302. The share icon 310 may relate to an action of initiating a screen sharing session by the user 302 where the user 302 shares images depicted on the device display screen. The recall icon 312 may relate to an action of recalling images or frames stored in buffer storage 320 before the images or frames are transmitted to the other participants 304. The set delay icon 314 may relate to an action of setting the amount of time delay between when the user 302 performs an action on the user device display screen and/or graphical user interface of an application, but not necessarily the graphical user interface 306 of the web conference application, and when the images or frames are transmitted to the other participants 304. The end or leave web conference icon 316 may relate to an action where the user 302 leaves the web conference with the other participants 304 and, if the user is the host, designates a new host among the other participants 304 or, only if the user is the host, ends the web conference for all participants.

In one or more embodiments, the screen sharing recall program 150 may include database 318 and buffer storage 320. Database 318 may be any repository, either local or remote, capable of storing the user preconfigured time delay setting for how long images or frames are stored in buffer storage 320. As previously described, the buffer storage 320 may include a repository for storing images or frames captured from the screen sharing session of the user 302 prior to transmitting the frames or images to the other participants 304. The buffer storage may be within computer 101, such as volatile memory 112 or persistent storage 113, or within storage 124 of peripheral device set 114. In one or more embodiments, the buffer storage may also be located on a server, such as remote server 104, public cloud 105, or private cloud 106.

At 324, prior to a user 302 beginning a screen sharing session with the other participants 304, the user 302 may interact with the graphical user interface 306 to select the set delay icon 314. For example, once the set delay icon 316 is interacted with by the user 302, the screen sharing recall program 150 may prompt the user to manually enter a screen sharing time delay value or select a value from two or more preconfigured delay values.

Next, at 326, once the user 302 makes a screen sharing time delay value, the screen sharing recall program 150 may store the user-desired screen sharing time delay value in a repository, such as database 318. Furthermore, the screen sharing recall program 150 may establish the size or capacity of the buffer storage 320 based on the user-desired screen sharing time delay value and, in one or more embodiments, the framerate of the screen sharing session and the resolution quality of the screen sharing session. In one or more other embodiments, the size or capacity of the buffer storage 320 may exceed these values and only be limited by the capacity of storage 124 or volatile memory 112 of the device, such as computer 101 or EUD 103.

Then, at 328, the screen sharing recall program 150 may begin the screen sharing session. However, prior to transmitting any images or frames to the other participants 304, the screen sharing recall program 150 may store images to the buffer storage 320 until the buffer storage is full or until a number of images equal to the screen sharing session framerate times the screen sharing time delay value is satisfied.

Figure 3B:
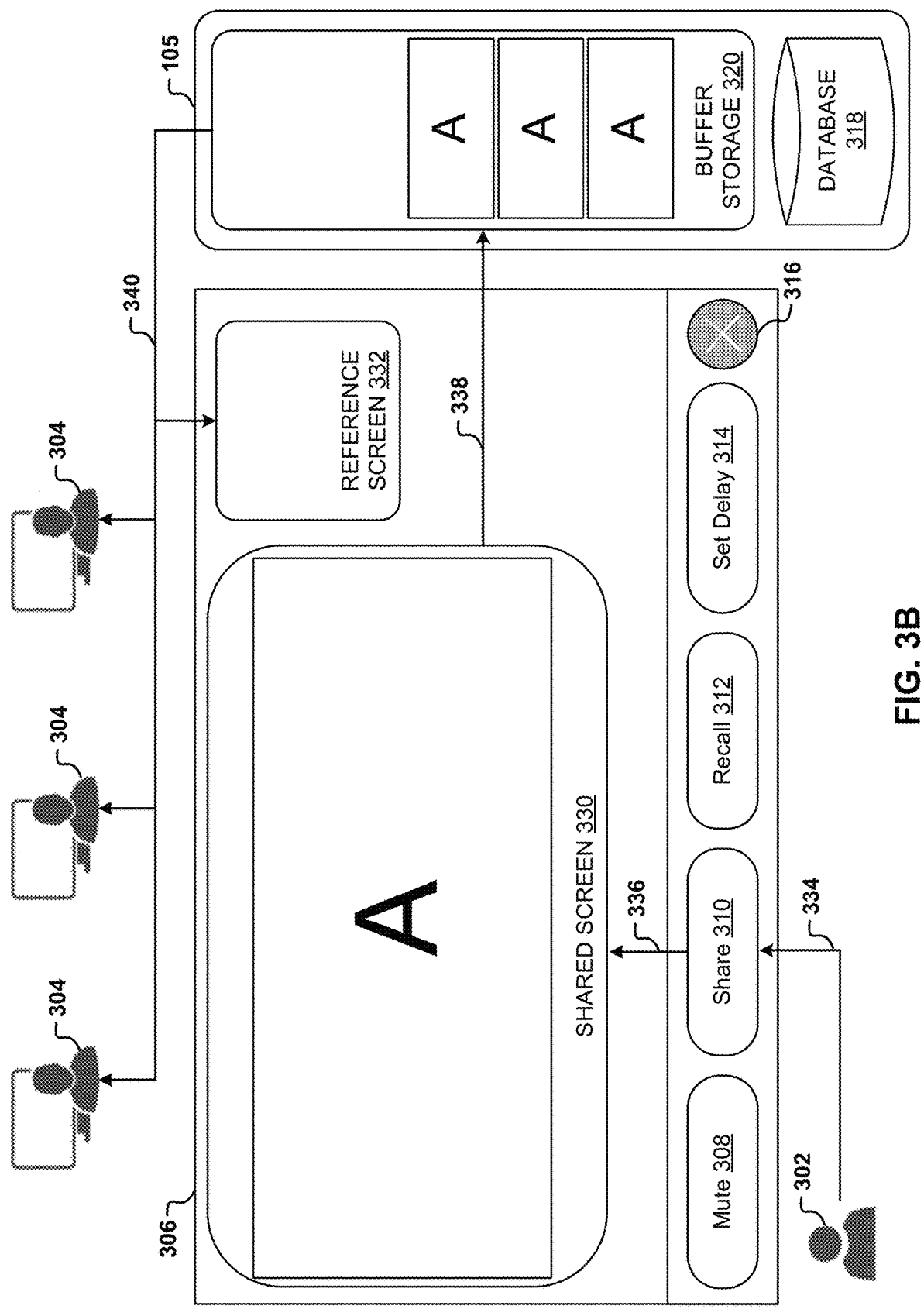

Referring now to FIG. 3B, at 334, during the web conference, the user 302 may interact with the share icon 310 to initiate a screen sharing session between the user 302 and other participants 304 during the web conference. At 336, once the user has initiated the screen sharing session, the screen sharing recall program 150 may begin capturing the shared screen 330. At 338, rather than immediately transmitting the images of the shared screen 330 to the other participants 304, the screen sharing recall program 150 may store each image in buffer storage 320. At 340, the screen sharing recall program 150 may not immediately transmit the images stored in buffer storage 320 as the capacity or preconfigured number of images that correspond to the user-desired screen sharing time delay has been satisfied. Therefore, no screen share may be presented to the other participants or the reference screen 332 depicted on the graphical user interface 306 to the user 302.

Figure 3C:
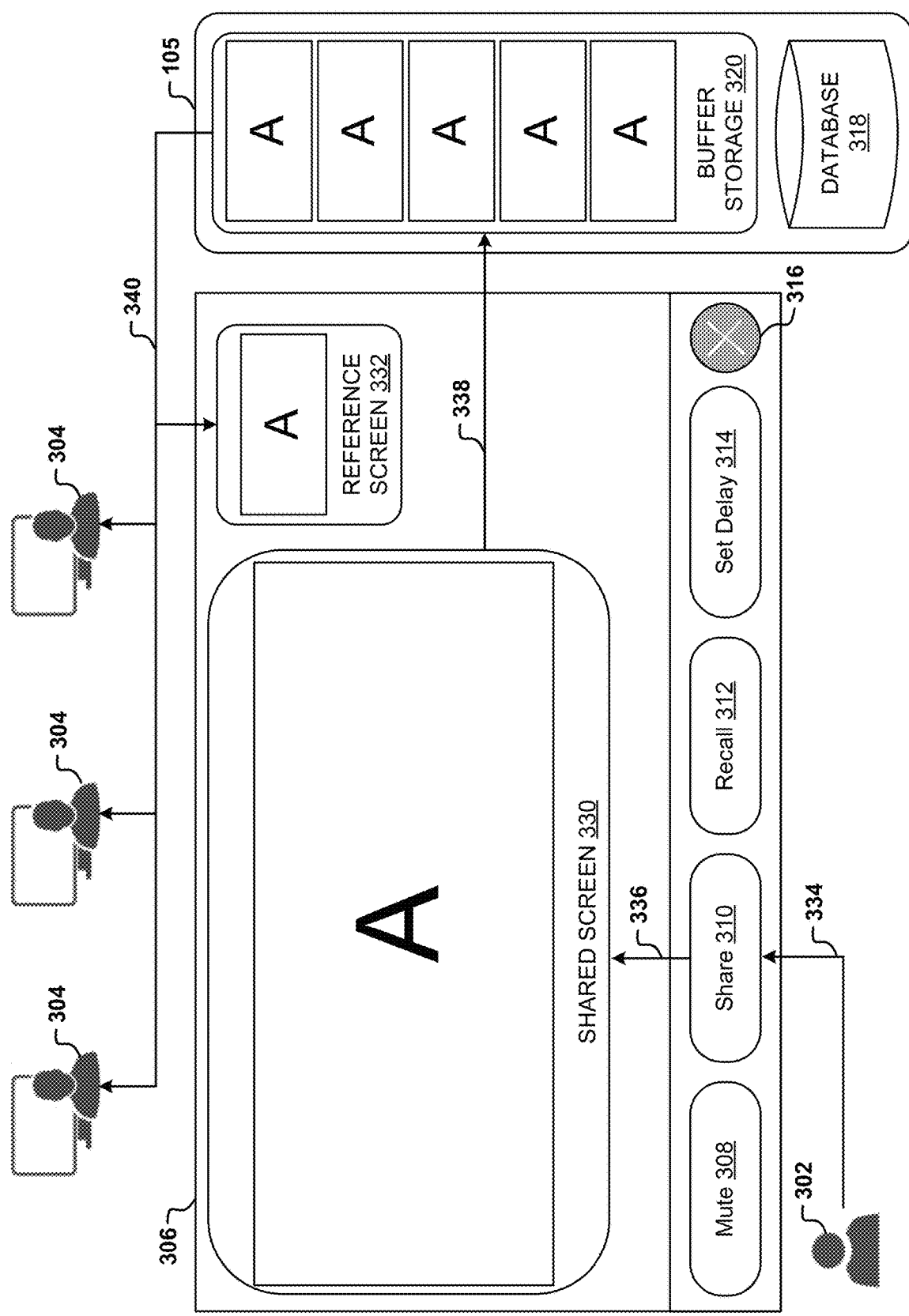

Referring now to FIG. 3C, once the buffer storage 320 has reached capacity or the preconfigured number of images that correspond to the user-desired screen sharing time delay has been satisfied, the screen sharing recall program 150 may begin transmitting the images on the shared screen 330 so that the other participants 304 and the reference screen 332 display the same time-delayed images or frames.

Figure 3D:
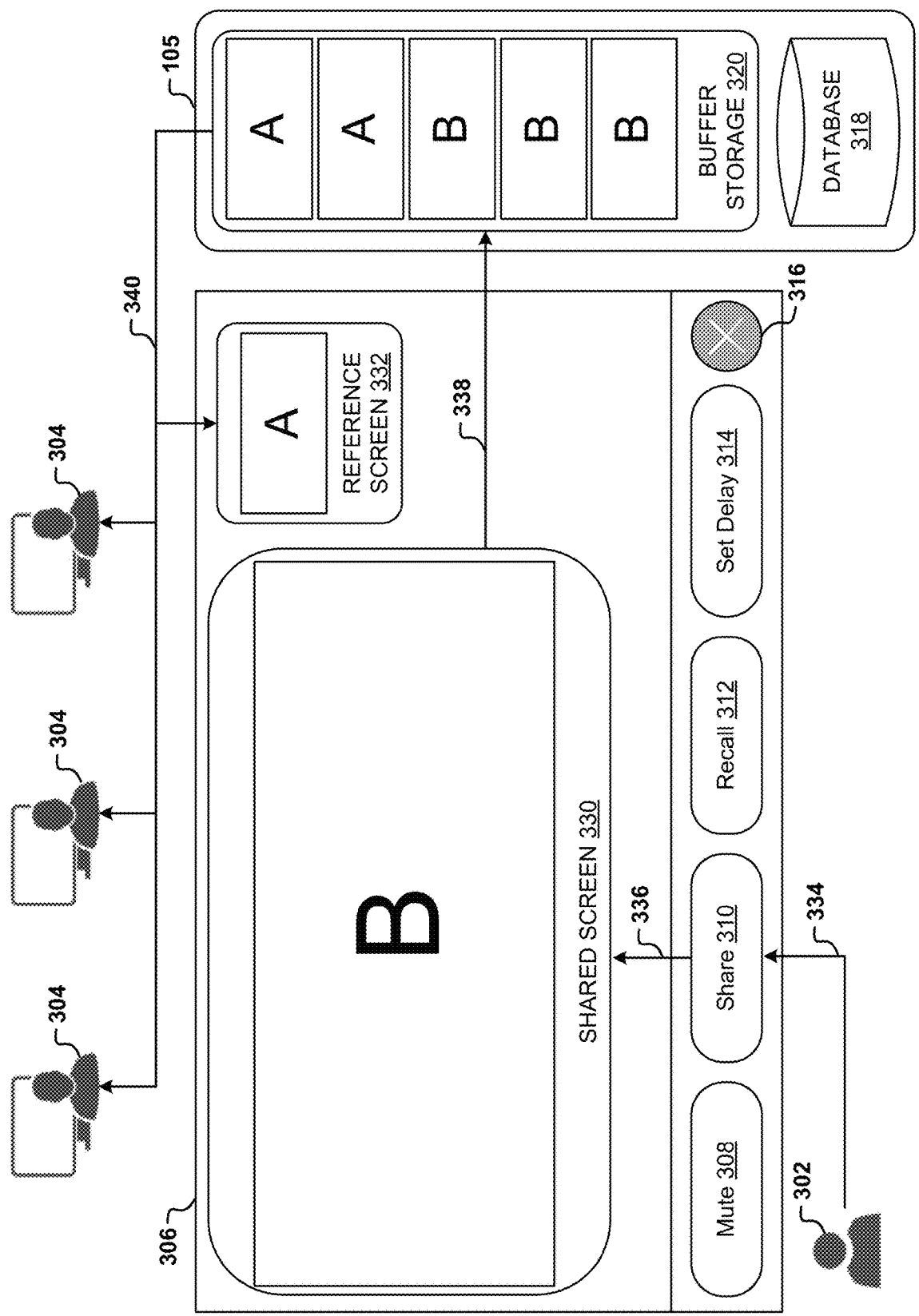

Referring now to FIG. 3D, during the screen sharing session, the user 302 may inadvertently change the image displayed on the shared screen 330. For example, the user 302 may first show image A that relates to information relevant to the web conference between the user 302 and the other participants 304. However, the user 302 may mistakenly open a window that displays image B containing confidential information not intended for sharing with the other participants 304. Since the inadvertently shared image was displayed on the shared screen 330, the screen sharing recall program 150 stores images of the shared screen in buffer storage 320. However, as depicted in FIG. 3D, buffer storage 320 has not yet reached a point where the inadvertently shared image B is shared with the other participants 304 and reference screen 332.

Figure 3E:
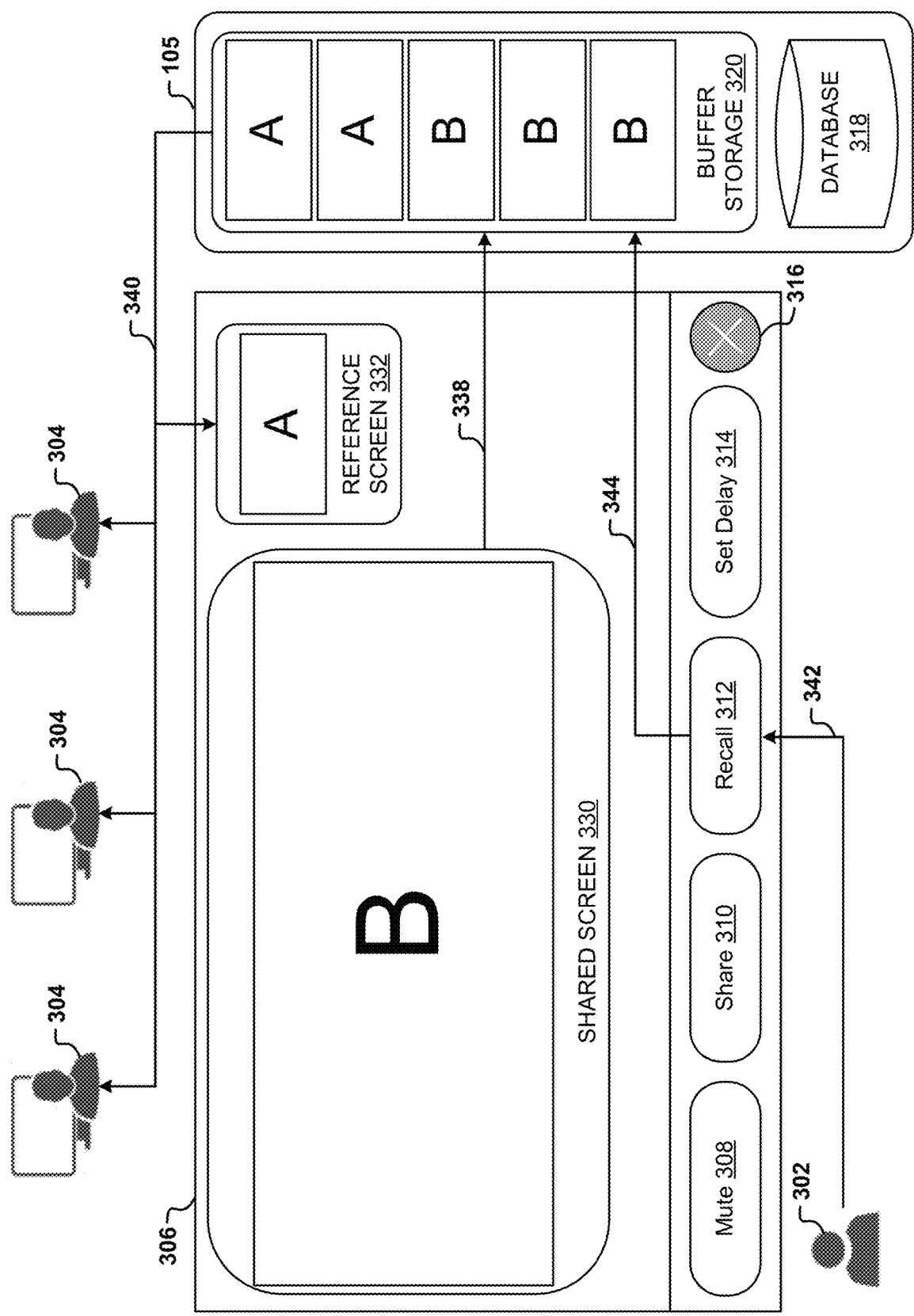

Referring now to FIG. 3E, at 342, since the screen sharing recall program 150 has not yet transmitted the inadvertently shared image (i.e., image B) to the other participants 304 or the reference screen 332, the screen sharing recall program 150 may allow a recall of the inadvertently shared image. In order to initiate a recall procedure of the inadvertently shared image, the user 302 may interact with the recall icon 312. At 344, the screen sharing recall program 150 may identify images within the buffer storage that should be deleted based on the settings stored in database 318.

Figure 3F:
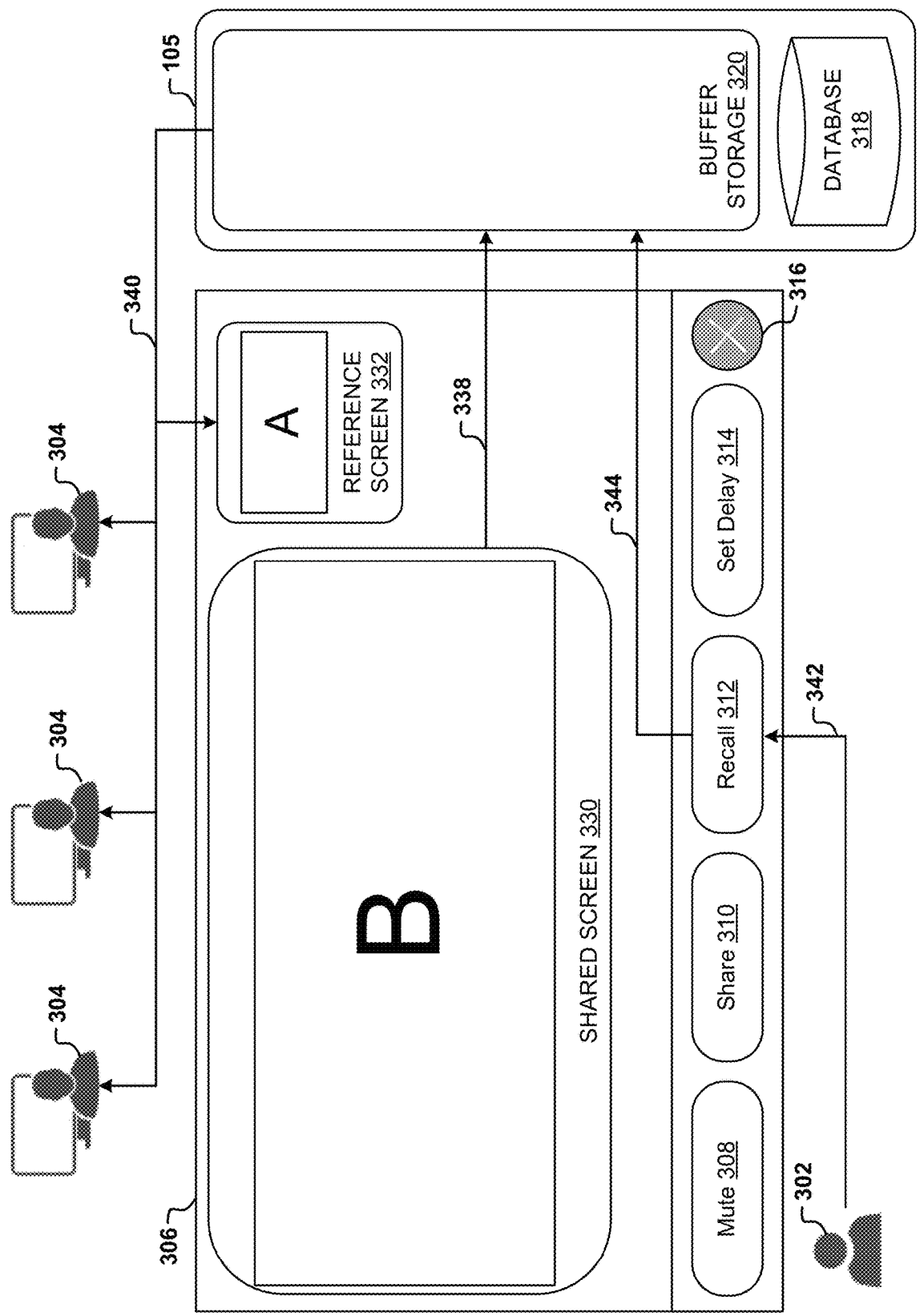

Referring now to FIG. 3F, once the screen sharing recall program 150 receives the recall instruction from the user 302 based on a user interaction with recall icon 312, the screen sharing recall program 150 may delete all images or only images relating to the inadvertently shared screen. In one or more situations, when the screen sharing recall program 150 deletes all images or frames in buffer storage 320 based on the recall instruction, the screen sharing recall program 150 may pause the screen share for the other participants 304 and the reference screen 332 at the last image or frame transmitted. For example, in the example embodiment depicted, image A was last transmitted to the other participants 304 and reference screen 332, therefore, the shared screen image presented to the other participants 304 and the reference screen 332 may remain as image A.

Figure 3G:
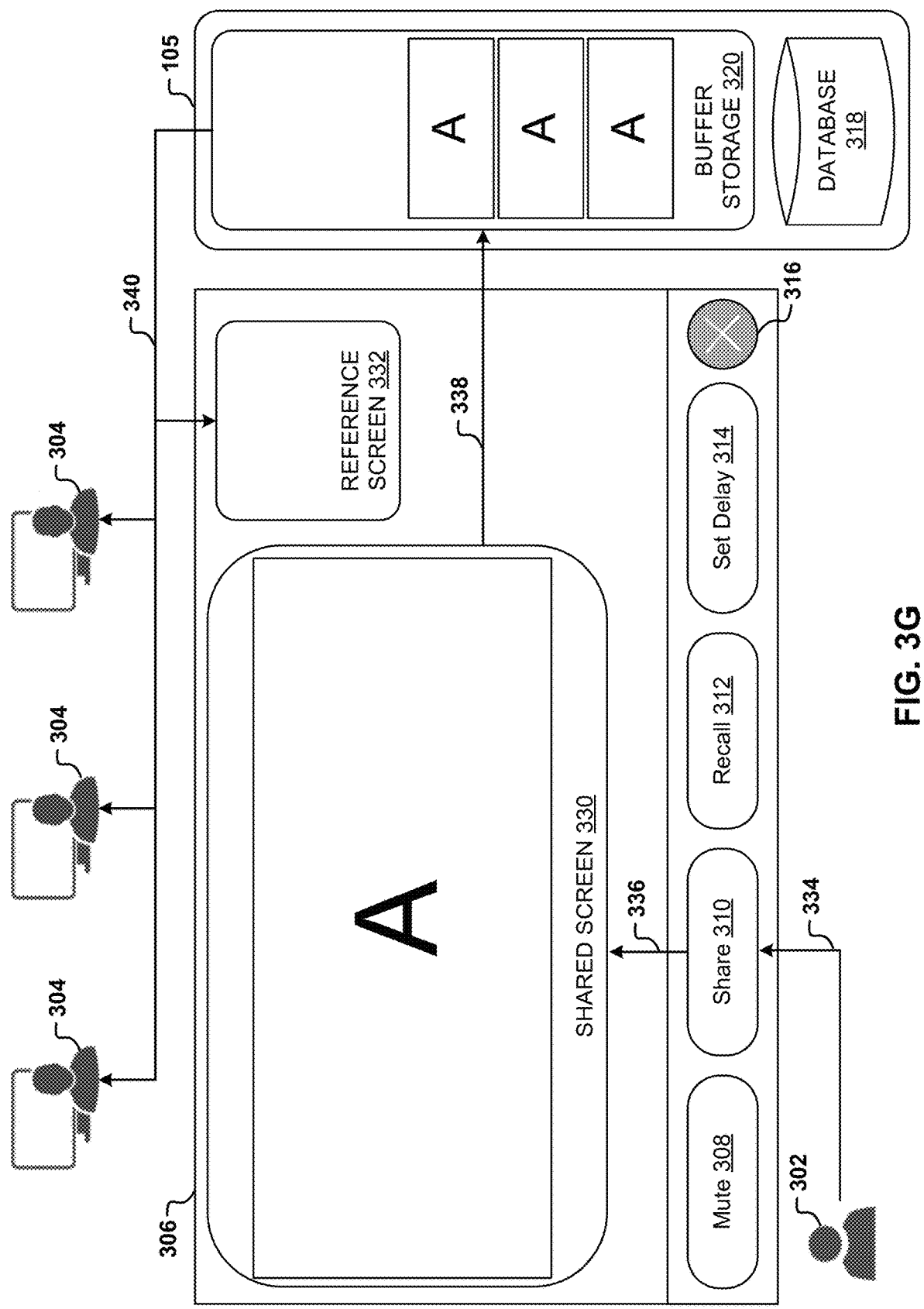

Referring now to FIG. 3G, once the screen sharing recall program 150 deletes all images or frames within the buffer storage 320, the screen sharing recall program 150 may commence the screen sharing session by beginning a new storage of images within the buffer storage 320. For example, at 334, the user 302 may re-select the share icon 310 once the user 302 returns to the intended image for presentation to the other participants 304 as was performed when originally initiating the screen sharing session in reference to FIG. 3A. At 336, the screen sharing recall program 150 may capture the images depicted on the shared screen 330 as a video feed and, at 338, store the captured images in the buffer storage 320. Depending on the configurations in database 318, the screen sharing recall program 150 may continue to display the last streamed image to the other participants 304 and the reference screen 332 or, as depicted in FIG. 3G, a blank screen.

Figure 3H:
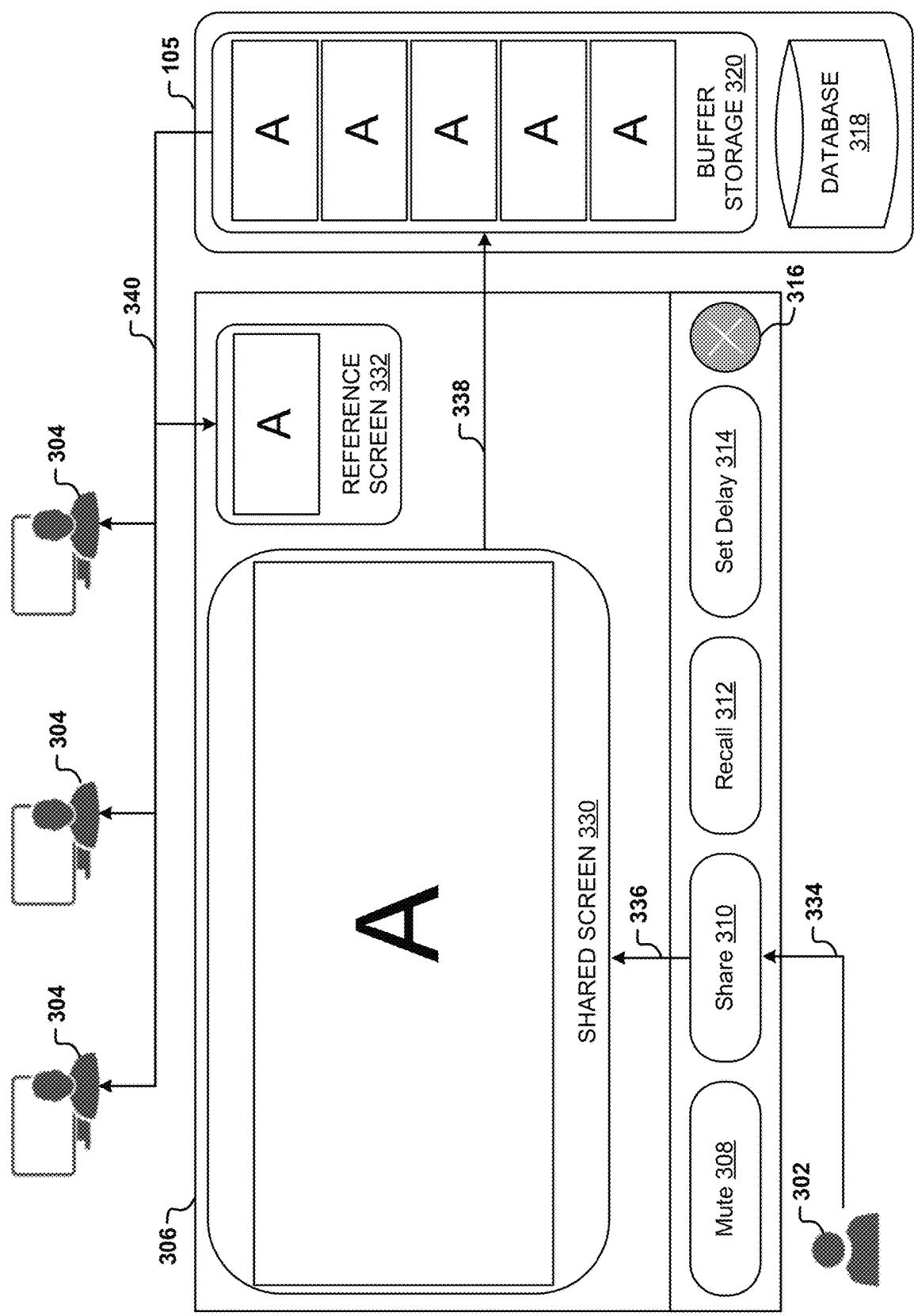

Referring now to FIG. 3H, once the buffer storage 320 has reached the limit necessary under the configured screen sharing time delay value, the screen sharing recall program 150 may begin transmitting the earliest received image to the other participants 304 and the reference screen 332 and, once transmitted, delete the image from the buffer storage 320 to free space for subsequently received images. This transmission, deletion, and reception process may iterate in such a manner that video may appear on the display screens of the other participants 304 and the reference window 332 for the user 302.

It may be appreciated that FIGS. 2 and 3A-3H provide only an illustration of one implementation and do not imply any limitations with regard to how different embodiments may be implemented. Many modifications to the depicted environments may be made based on design and implementation requirements.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A processor-implemented method, the method comprising:
   receiving a user-selected delay setting value;
   in response to receiving an instruction from a user to begin a screen sharing session during a web conference, storing streamed frames captured of a user display screen in a buffer;
   in response to a frame from the buffer satisfying the user-selected delay setting value, transmitting the frame to a graphical user interface associated with each other participant to the web conference; and
   in response to determining the user wishes to recall one or more frames stored in the buffer, performing a recall action.

2. The method of claim 1, wherein the user-selected delay setting value is a time for which a frame from the screen sharing session is stored in the buffer.

3. The method of claim 1, further comprising:
   in response to a frame from the buffer satisfying the user-selected delay setting value, transmitting the frame to a sub-window within a graphical user interface associated with the user.

4. The method of claim 1, wherein the recall action further comprises:
   deleting all frames within the buffer; and
   displaying a still image of a last transmitted frame to each other participant until a frame in the buffer satisfies the user-selected delay setting value.

5. The method of claim 1, wherein the recall action further comprises:
   displaying a still image of a last transmitted frame to each other participant;
   prompting the user to select one or more frames within the buffer to delete;
   deleting the one or more selected frames; and in response to each frame stored within the buffer satisfying the user-selected delay setting value, transmitting each frame to each other participant in a first-in, first-out manner according to a framerate of screen capture of the user.

6. The method of claim 1, further comprising:
deleting the frame from the buffer once the frame is transmitted to each other participant.

7. The method of claim 1, wherein a size of the buffer is configurable to based on a framerate of screen sharing by the user, a resolution of each frame, and the use-selected delay setting value.

8. A computer system, the computer system comprising:
one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising:
receiving a user-selected delay setting value;
in response to receiving an instruction from a user to begin a screen sharing session during a web conference, storing streamed frames captured of a user display screen in a buffer;
in response to a frame from the buffer satisfying the user-selected delay setting value, transmitting the frame to a graphical user interface associated with each other participant to the web conference; and
in response to determining the user wishes to recall one or more frames stored in the buffer, performing a recall action.

9. The computer system of claim 8, wherein the user-selected delay setting value is a time for which a frame from the screen sharing session is stored in the buffer.

10. The computer system of claim 8, wherein the method further comprises:
in response to a frame from the buffer satisfying the user-selected delay setting value, transmitting the frame to a sub-window within a graphical user interface associated with the user.

11. The computer system of claim 8, wherein the recall action further comprises:
deleting all frames within the buffer; and
displaying a still image of a last transmitted frame to each other participant until a frame in the buffer satisfies the user-selected delay setting value.

12. The computer system of claim 8, wherein the recall action further comprises:
displaying a still image of a last transmitted frame to each other participant;
prompting the user to select one or more frames within the buffer to delete;
deleting the one or more selected frames; and
in response to each frame stored within the buffer satisfying the user-selected delay setting value, transmitting each frame to each other participant in a first-in, first-out manner according to a framerate of screen capture of the user.

13. The computer system of claim 8, wherein the method further comprises:

deleting the frame from the buffer once the frame is transmitted to each other participant.

14. The computer system of claim 8, wherein a size of the buffer is configurable to based on a framerate of screen sharing by the user, a resolution of each frame, and the use-selected delay setting value.

15. A computer program product, the computer program product comprising:
one or more computer-readable tangible storage medium and program instructions stored on at least one of the one or more tangible storage medium, the program instructions executable by a processor capable of performing a method, the method comprising:
receiving a user-selected delay setting value;
in response to receiving an instruction from a user to begin a screen sharing session during a web conference, storing streamed frames captured of a user display screen in a buffer;
in response to a frame from the buffer satisfying the user-selected delay setting value, transmitting the frame to a graphical user interface associated with each other participant to the web conference; and
in response to determining the user wishes to recall one or more frames stored in the buffer, performing a recall action.

16. The computer program product of claim 15, wherein the user-selected delay setting value is a time for which a frame from the screen sharing session is stored in the buffer.

17. The computer program product of claim 15, wherein the method further comprises:
in response to a frame from the buffer satisfying the user-selected delay setting value, transmitting the frame to a sub-window within a graphical user interface associated with the user.

18. The computer program product of claim 15, wherein the recall action further comprises:
deleting all frames within the buffer; and
displaying a still image of a last transmitted frame to each other participant until a frame in the buffer satisfies the user-selected delay setting value.

19. The computer program product of claim 15, wherein the recall action further comprises:
displaying a still image of a last transmitted frame to each other participant;
prompting the user to select one or more frames within the buffer to delete;
deleting the one or more selected frames; and
in response to each frame stored within the buffer satisfying the user-selected delay setting value, transmitting each frame to each other participant in a first-in, first-out manner according to a framerate of screen capture of the user.

20. The computer program product of claim 15, wherein the method further comprises:
deleting the frame from the buffer once the frame is transmitted to each other participant.

* * * * *